United States Patent
Wakamizu (10) Patent No.: US 8,547,653 B2
(45) Date of Patent: Oct. 1, 2013

(54) LENS BARREL AND OPTICAL INSTRUMENT

(75) Inventor: Yoh Wakamizu, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/003,815

(22) PCT Filed: Jul. 15, 2009

(86) PCT No.: PCT/JP2009/062792
§ 371 (c)(1),
(2), (4) Date: Apr. 8, 2011

(87) PCT Pub. No.: WO2010/008015
PCT Pub. Date: Jan. 21, 2010

(65) Prior Publication Data
US 2011/0181967 A1    Jul. 28, 2011

(30) Foreign Application Priority Data

Jul. 17, 2008  (JP) ................................. 2008-186190
Jul. 17, 2008  (JP) ................................. 2008-186191

(51) Int. Cl.
    *G02B 7/02*   (2006.01)
(52) U.S. Cl.
    USPC .......................................... 359/817; 396/349
(58) Field of Classification Search
    USPC ................... 359/817, 823, 708; 396/73, 348, 396/350
    See application file for complete search history.

(56) References Cited

U.S. PATENT DOCUMENTS

| 4,669,848 A | 6/1987 | Wakabayashi |
| 4,768,048 A | 8/1988 | Wakabayashi |
| 4,864,338 A | 9/1989 | Wakabayashi |

(Continued)

FOREIGN PATENT DOCUMENTS

| JP | A-59-044032 | 3/1984 |
| JP | A-60-222812 | 11/1985 |

(Continued)

OTHER PUBLICATIONS

Oct. 2, 2012 Office Action issued in Japanese Patent Application No. 2008-186191 (with translation).

(Continued)

*Primary Examiner* — Thomas K Pham
*Assistant Examiner* — Sharrief Broome
(74) *Attorney, Agent, or Firm* — Oliff & Berridge, PLC (57) ABSTRACT

The present invention provides a miniaturized lens barrel and optical instrument. The lens barrel (1) is constituted to be provided with a lens (L2) which is retained in a retaining frame (82) pivotally supported by a shaft portion (83) parallel to the optical axis (A), and which moves between a first position and a second position in a plane perpendicular to the optical axis by rotation of the retaining frame about the shaft portion; a protuberance (85) formed to protrude in a direction perpendicular to the optical axis; and a moving member (70) which is moveable with respect to the retaining frame and which includes a retaining face portion (70a) which, in a state where it abuts the protuberance, retains the lens in the first position, and a recessed portion (72) formed at one portion of the retaining face portion; and is constituted such that the protuberance moves between a state where it abuts the retaining face portion, and a state where it is accommodated in the recessed portion, in accordance with movement of the moving member, and the lens is retained in a second position in the state where the protuberance is accommodated in the recessed portion.

16 Claims, 8 Drawing Sheets

(56) References Cited

U.S. PATENT DOCUMENTS

| | | | |
|---|---|---|---|
| 4,887,107 | A | 12/1989 | Nakamura et al. |
| 5,701,206 | A | 12/1997 | Sasaki et al. |
| 7,785,021 | B2* | 8/2010 | Kato ............................ 396/348 |
| 2003/0156832 | A1* | 8/2003 | Nomura et al. ................. 396/72 |
| 2004/0179130 | A1 | 9/2004 | Omiya et al. |
| 2004/0228626 | A1* | 11/2004 | Endo et al. .................... 396/349 |
| 2005/0254144 | A1 | 11/2005 | Sakamoto |
| 2006/0045517 | A1* | 3/2006 | Kato ............................ 396/349 |
| 2006/0209192 | A1 | 9/2006 | Shinohara et al. |
| 2008/0007847 | A1 | 1/2008 | Koyama |
| 2008/0291320 | A1 | 11/2008 | Omiya et al. |
| 2008/0310035 | A1 | 12/2008 | Kato |

FOREIGN PATENT DOCUMENTS

| | | |
|---|---|---|
| JP | A-63-34524 | 2/1988 |
| JP | A-09-015479 | 1/1997 |
| JP | A-11-023937 | 1/1999 |
| JP | A-2003-149723 | 5/2003 |
| JP | A-2004-258312 | 9/2004 |
| JP | A-2004-318051 | 11/2004 |
| JP | A-2005-326627 | 11/2005 |
| JP | 2006072003 A * | 3/2006 |
| JP | A-2006-072003 | 3/2006 |
| JP | A-2006-084728 | 3/2006 |
| JP | A-2006-234951 | 9/2006 |
| JP | A-2006-259344 | 9/2006 |
| JP | A-2007-178751 | 7/2007 |
| JP | A-2007-316386 | 12/2007 |

OTHER PUBLICATIONS

Sep. 11, 2012 Office Action issued in Japanese Application No. 2008-186190 (with translation).

International Search Report issued in Application No. PCT/JP2009/062792; Dated Oct. 20, 2009.

May 14, 2013 Office Action issued in Japanese Application No. 2008-186190 (with English translation).

Jun. 4, 2013 Office Action issued in Japanese Application No. 2008-186191 (with English translation).

* cited by examiner

LENS BARREL AND OPTICAL INSTRUMENT

TECHNICAL FIELD

The present invention relates to a lens barrel and an optical instrument.

BACKGROUND ART

As a retractable lens barrel whose overall length changes when photographing and when not photographing, one where a part of the lenses withdraw from the optical path coupled with the retraction operation of the lens and whose overall length is shortened during storage is known in the prior art (for example, see Patent Publication 1).

Patent Publication 1: Japanese Unexamined Patent Publication No. 2003-149723

DISCLOSURE OF THE INVENTION

Problems to be Solved by the Invention

In recent years, there has been a desire to further miniaturize cameras, and also to further miniaturize lens barrels.

The problem to be solved by the present invention is to provide a miniaturized lens barrel and optical instrument.

Means for Solving the Problems

The present invention solves the above problem by the following means. Further, for ease of understanding, explanations are given assigning reference numerals corresponding to the embodiment of the present invention, but these are not limiting.

A invention according to the claim 1 is a lens barrel comprising: a lens which is retained by a retaining frame pivotally supported by a shaft portion parallel to an optical axis, and which moves between a first position and a second position in a plane perpendicular to the optical axis by rotation of the retaining frame about the shaft portion, a protuberance provided at the retaining frame and formed so as to protrude in a direction perpendicular to the optical axis, a moving member which is moveable with respect to the retaining frame, and which comprises a retaining face portion which, in a state where it abuts the protuberance, retains the lens in the first position, and a recessed portion formed at one portion of the retaining face portion, wherein: the protuberance moves between a state where it abuts the retaining face portion, and a state where it is accommodated in the recessed portion, in accordance with movement of the moving member, and the lens is maintained the second position in the state where the protuberance is accommodated in the recessed portion.

A invention according to the claim 2 is the lens barrel according to claim 1, further comprising: an biasing portion which biases the retaining frame in a direction such that the protuberance presses the retaining face portion of the moving member.

A invention according to the claim 3 is the lens barrel according to claim 1 or 2, wherein: the protuberance is accommodated in the recessed portion after sliding to the retaining face portion, by a movement in a first direction of the moving member, and the recessed portion comprises an accommodating retaining region which retains the protuberance in an accommodated state even if the moving member moves further in the first direction when the protuberance is in the accommodated state.

A invention according to the claim 4 is the lens barrel according to claim 3, wherein: the moving member comprises a cam groove which makes the retaining frame move in the optical axis direction by a movement in the first direction in a state where the protuberance is accommodated in the recessed portion, the accommodating retaining region is a parallel groove portion formed parallel to the cam groove, and when the retaining frame moves in the optical axis direction, the protuberance moves into the parallel groove portion.

A invention according to the claim 5 is the lens barrel according to any one of claims 1 to 4, wherein: the retaining frame moves in the optical axis direction with respect to the moving member, coupled with a rotating movement about the shaft portion, the recessed portion provided on the moving member comprises a linear groove portion provided parallel to the optical axis, and the protuberance moves in the linear groove portion when the retaining frame moves in the optical axis direction.

A invention according to the claim 6 is the lens barrel according to any one of claims 1 to 5, wherein the retaining frame comprises a bearing portion which is pivotally supported by the shaft portion, a retaining portion which retains the lens, and a connecting portion which connects the bearing portion and the retaining portion, and the protuberance is formed at the bearing portion.

A invention according to the claim 7 the lens barrel according to any one of claims 1 to 6, wherein: the moving member is a tube accommodating the retaining frame at an inner diameter side, the retaining face portion and the recessed portion are respectively formed at an inner peripheral face of the moving member, the protuberance transfers between a state abutting the retaining face portion, and a state accommodated in the recessed portion, by rotation of the moving member about the moving member's center.

A invention according to the claim 8 is a lens barrel comprising: a lens which is retained at a retaining frame pivotally supported by a shaft portion parallel to an optical axis, and which moves between a first position and a second position in a plane perpendicular to the optical axis by rotation of the retaining frame about the shaft portion, a support portion which pivotally supports the retaining frame, a driving mechanism which drives the retaining frame in an optical axis direction with respect to the support portion according to a rotating movement about the shaft portion of the retaining frame.

A invention according to the claim 1 is 8 is the lens barrel according to claim 8, wherein: the retaining frame comprises a bearing portion which is pivotally supported by the shaft portion, and the driving mechanism drives the bearing portion in the optical axis direction.

A invention according to the claim 10 is the lens barrel according to claim 8 or 9, wherein: the driving mechanism is formed at two locations sandwiching the shaft portion.

A invention according to the claim 11 is the lens barrel according to any one of claims 8 to 10, wherein: the driving mechanism is a cam mechanism which converts power in a rotational direction acting on the retaining frame into power in the optical axis direction.

A invention according to the claim 12 is the lens barrel according to 11, wherein: the cam mechanism comprises an inclined face portion formed inclined with respect to a face perpendicular to the optical axis, and a sliding portion provided at the inclined face portion to be capable of sliding in response to a rotating movement of the retaining frame, and the retaining frame moves in the optical axis direction by the sliding portion being guided by the inclined face portion during the rotating movement.

A invention according to the claim 13 is the lens barrel according to 12, wherein: the inclined face portion is provided at both the retaining frame and the support portion, and the retaining frame is driven in the optical axis direction by sliding of the inclined face portions with respect to each other.

A invention according to the claim 14 is the lens barrel according to any one of claims 8 to 13, wherein: the retaining frame is provided with a planar portion perpendicular to the optical axis, and in the state where it has drawn close to the support portion, the position in the optical axis direction with respect to the support portion is regulated by the abutting of the planar portion and the support portion.

A invention according to the claim 15 is the lens barrel according to any one of claims 8 to 14, further comprising: an biasing portion which biases the retaining frame towards the support portion.

A invention according to the claim 16 is an optical instrument comprising the lens barrel according to any one of claims 1 to 15.

Further, the constitutions explained with the assigned reference numerals may be suitably improved, or at least a portion thereof may be replaced with other constituents.

Effects of the Invention

According to the present invention, it is possible to provide a miniaturized lens barrel and optical instrument.

EXPLANATION OF THE REFERENCE NUMBERS

1: lens barrel
70: rotating cam tube
70a: inner peripheral face portion
72: driving groove
82: second unit retaining frame
83: rotating shaft
85: protuberance
L2: second lens unit

EMBODIMENTS FOR CARRYING OUT THE INVENTION

Below, a camera including an embodiment of a lens barrel which applies the present invention is explained with reference to the drawings and the like.

Figure 1:
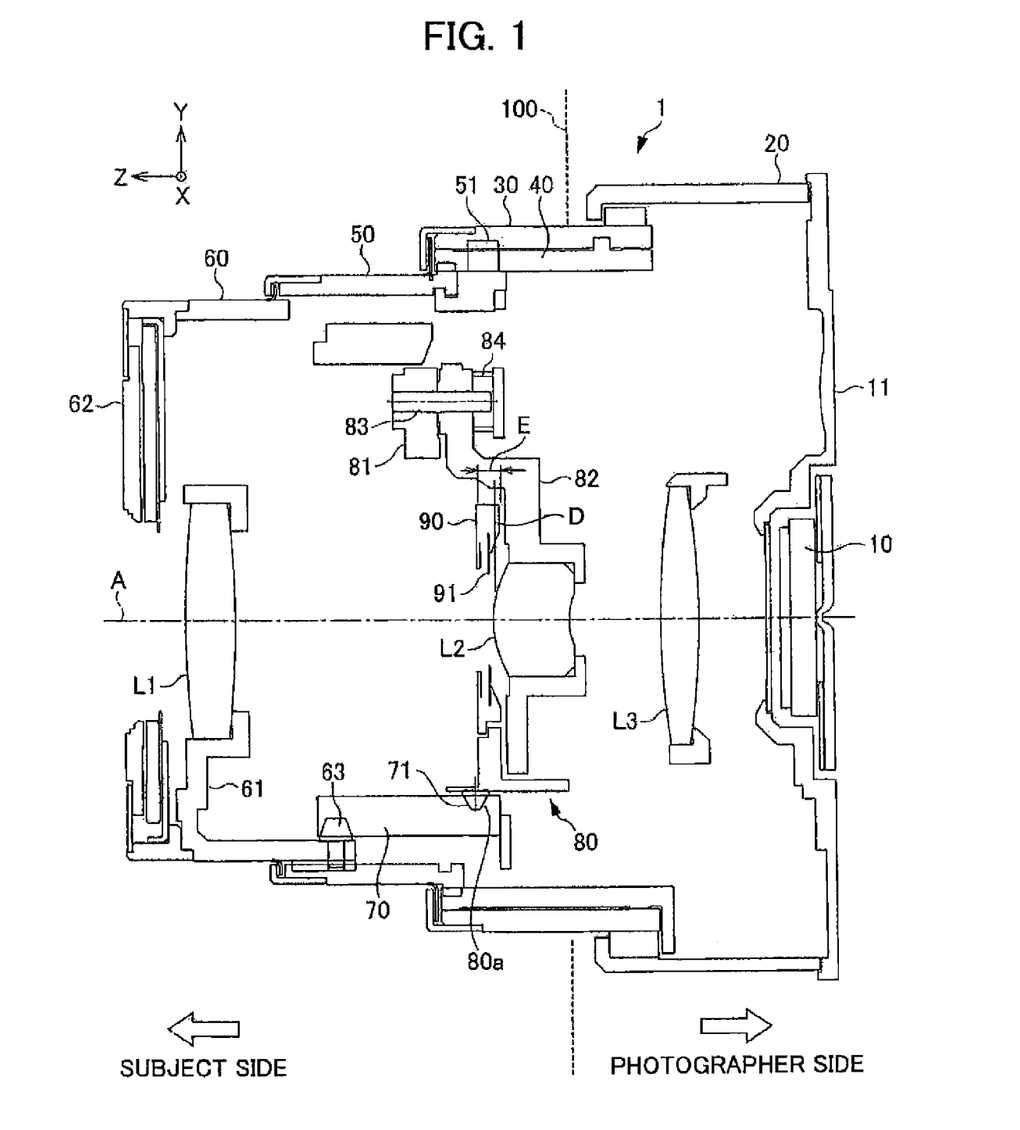
FIG. 1 is a cross sectional view of the lens barrel of the embodiment, showing the photographing state.

FIG. 1 is a cross sectional view of the lens barrel of the embodiment, showing the photographing state.

Figure 2:
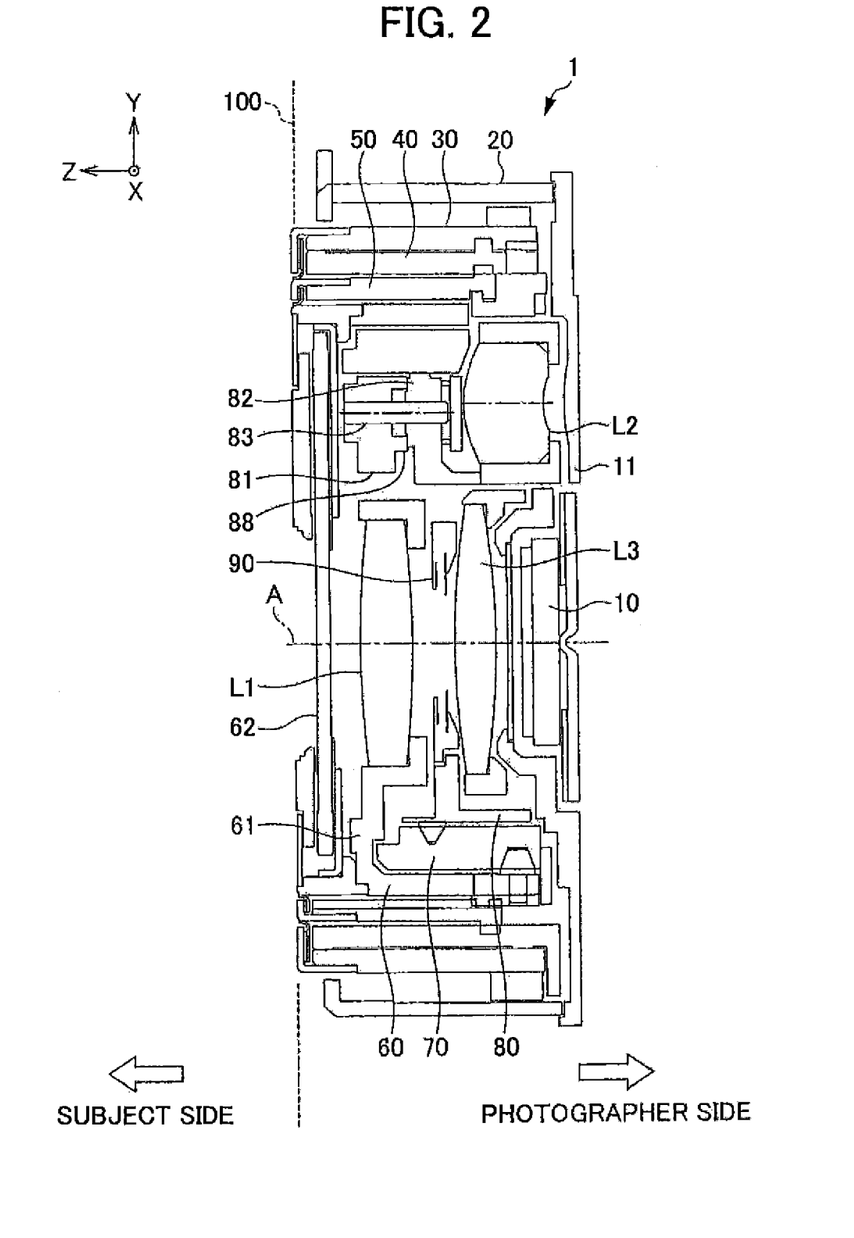
FIG. 2 shows the retracted state of the lens barrel shown in FIG. 1.

FIG. 2 shows the retracted state of the lens barrel shown in FIG. 1.

Below, explanations are given establishing a three dimensional coordinate system consisting of X, Y and Z axes in all the drawings including FIG. 1.

The lens barrel 1 of the embodiment is, for example, a retractable lens barrel whose overall length in the optical axis direction changes when photographing and when not photographing. A portion of the lens barrel 1 projects from the camera main body 100 when photographing, and when not photographing, approximately its full body is accommodated in the camera main body 1.

The lens barrel 1 is provided with a first lens unit L1, a second lens unit L2, a third lens unit L3, a CCD 10, a fixed tube 20, a rotating tube 30, a translating cam tube 40, a translating tube 50, a first lens unit retaining tube 60, a rotating cam tube 70, a second unit support portion 80, a shutter unit 90, and the like.

The first lens unit L1, second lens unit L2, and third lens unit L3 form a zoom lens constituted of 3 units, and are disposed in this order from the photographic subject side towards the photographer side in the optical axis (explained with the assigned reference numeral A in FIG. 1) direction. The incident face of the second lens unit L2 is a convex lens which projects out towards the photographic subject side in the optical axis direction.

The CCD 10 is photoelectric conversion element which converts the photographic subject light which has passed through the above lens units L1 to L3 into an electric signal. The CCD 10 is disposed at the exit side of the third lens unit L3. The CCD 10 is fixed to an approximately disk-shaped member referred to as the CCD support 11.

The fixed tube 20 is a tube whose end at the photographer side in the optical axis direction is fixed to the CCD support 11.

The rotating tube 30 is a tube accommodated at the inner diameter side of the fixed tube 20. The rotating tube 30 rotates about its central axis in response to power transmitted by an actuator, not shown in the drawings, and carries out advancing and retreating operations in the optical axis direction guided by helicoid screws, not shown in the drawings, provided at the fixed tube 20 and the rotating tube 30.

The translating cam tube 40 is a tube which moves in the optical axis direction integrally with the rotating tube 30, and is accommodated at the inner diameter side of the rotating tube 30. The translating cam tube 40 is provided with projections which are inserted into the translating grooves (respectively omitted from the drawings) formed at the inner peripheral face of the fixed tube 20, and when moving in the optical axis direction, it moves directly without an accompanying rotational movement.

The translating tube 50 is a tube accommodated at the inner diameter side of the translating cam tube 40. The translating tube 50 is provided with a cam follower 51 which passes through the translating groove formed in the translating cam tube 40. The tip portion of this cam follower 51 is inserted into a cam groove formed at the rotating tube 30, and the translating tube 50 directly moves in the optical axis direction coupled with the rotational movement of the rotating tube 30.

The first lens unit retaining tube 60 is a tube accommodated at the inner diameter side of the translating tube 50, and a first unit retaining frame 61 which retains the first lens unit L1 is fixed to at its end portion of the photographic subject side in the optical axis direction.

The first lens unit retaining tube 60 is directly moveable in the optical axis direction with respect to the translating tube 50 by a cam mechanism, not shown. The first lens unit retaining tube 60 is connected at its end portion at the photographic subject side in the optical axis direction to the lens barrier unit 62 which protects the incident face of the first lens unit L1 when not photographing.

The rotating cam tube 70 is a tube accommodated at the inner diameter side of the first lens unit retaining tube 60. At the outer peripheral face of the rotating cam tube 70, a cam groove is formed, and a cam follower 63 provided at the first lens unit retaining tube 60 is inserted.

When the lens barrel 1 moves from the retracted state shown in FIG. 2 to the photographing state shown in FIG. 1, and in the photographing state, when the zoom lens moves between the tele position and the wide position, the rotating cam tube 70 performs a rotating movement about its central axis. Further, the tele position of the zoom lens is the position at which the focal length of the zoom lens is the greatest (the photographic angle is the smallest) and the wide position is the position at which the focal length is the smallest (the photographic angle is the widest).

The second unit support portion 80 is a portion which supports the second lens unit L2. The second unit support portion 80 is provided with a cam follower 80*a* which is inserted at the cam groove 71 formed at the inner peripheral face of the rotating cam tube 70, and directly moves in the optical axis direction coupled with the rotational movement of the rotating cam tube 70.

The constitution of the second unit support portion 80 is explained in more detail later.

The shutter unit 90 is a publicly known lens shutter apparatus disposed at the incident face side of the second lens unit L2, and is fixed to the second unit support portion 80. The shutter unit 90 is provided with shutter blades 91 which are moveable between a shielding position which shields the light path of the photographic subject light passing through the first to third lens units L1 to L3, and a withdrawn position which is withdrawn from the light path.

When the lens barrel 1 moves from the photographing state shown in FIG. 1 to the retracted state shown in FIG. 2, the second lens unit L2 moves (slides) in a plane perpendicular to the optical axis A, and withdraws from the optical path of the other lens units L1 and L3. Then, in the retracted state of the lens barrel 1, the third lens unit L3 is accommodated in the space formed by the withdrawal of the second lens unit L2, as shown in FIG. 2. Because of this, the overall length of the lens barrel 1 can be shortened in the retracted state.

The second lens unit L2, in the state where the power of the camera is off, withdraws to the withdrawn position shown in FIG. 2, and when the power is controlled to be on, moves to the photographing position (the position where the optical axis of the second lens unit L2 substantially coincides with the optical axes of the other lens units L1 and L3).

Below, the moving mechanism of the second lens unit L2 is explained.

Figure 3:
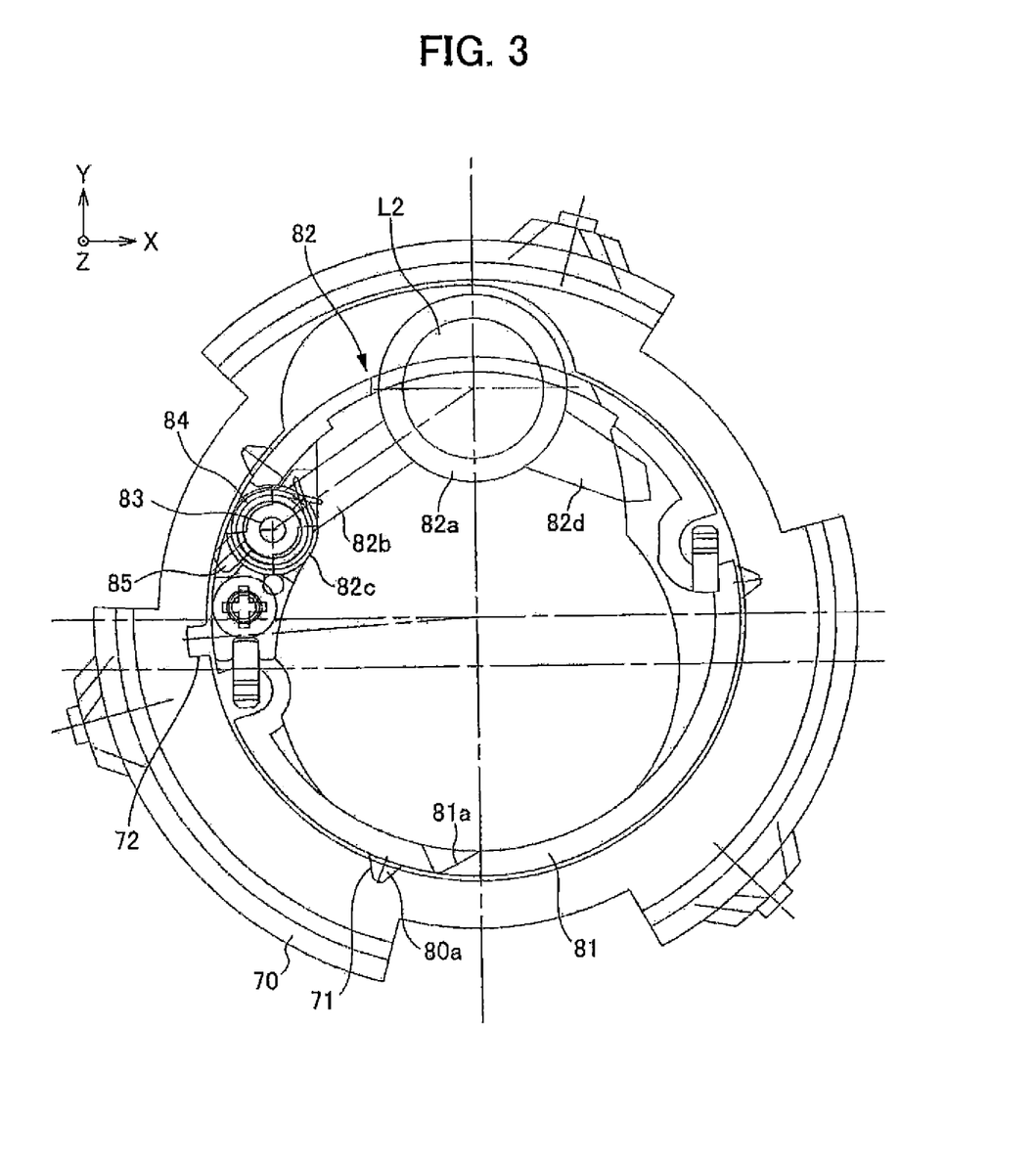
FIG. 3 is a plan view (withdrawn position) seen from the optical axis direction of the rotating cam tube and the second unit support portion provided at the lens barrel shown in FIG. 1.

FIG. 3 is a plan view seen from the optical axis direction of the rotating cam tube and the second unit support member provided in the lens barrel shown in FIG. 1. FIG. 3 shows the retracted state where the second lens unit L2 is disposed in the withdrawn position (refer to FIG. 2).

The second unit support portion 80 is provided with the main body portion 81 which is formed in a cylindrical shape, and the second unit retaining frame 82 which is a frame which retains the second lens unit L2.

The cam followers 80*a* which are inserted at the cam groove 71 of the above mentioned rotating cam tube 70 are provided at the outer peripheral face of the main body portion 81. The cam followers 80*a* are provided at approximately equal intervals, and for example 3 may be provided. The above mentioned shutter unit 90, as shown in FIG. 1, is fixed to the main body portion 81.

The second unit retaining frame 82 is provided with the retaining portion 82*a* which is a portion with an annular shape which accommodates the second lens unit L2 at its inner diameter side, and the arm portion 82*b* formed to protrude from the outer peripheral face of this retaining portion 82*a*. A bearing portion 82*c* formed with a cylindrical shape is provided at the tip portion of the arm portion 82*b*. A rotating shaft 83 which extends approximately parallel to the optical axis A is provided at the main body portion 81. The second unit retaining frame 82 is pivotally supported so as to be rotatable at the rotating shaft 83 via the bearing 82*c*.

The second unit retaining frame 82 is biased to the photographing position by the torsion spring 84 provided at the main body portion 81, and in the withdrawn position shown in FIG. 3, is withdrawn to the withdrawn position against the biasing force of the torsion spring 84. This torsion spring 84 is also provided with the function of a compression coil spring and biases the second unit retaining frame 82 in a direction to approach the shutter unit 90 fixed to the main body portion 81.

A protuberance 85 formed to project towards the outer diameter side of the bearing portion 82*c* from an area of the opposite side of the arm portion 82*b*, is provided at the outer peripheral face of the bearing portion 82*c* of the second unit retaining frame 82. The second unit retaining frame 82 withdraws to the withdrawn position against the biasing force of the torsion spring 84 by the contact of this protuberance 85 with the inner peripheral face of the rotating cam tube 70.

From the retracted state where the second lens unit L2 is withdrawn, shown in FIG. 3, when the power switch of the camera is operated to be on, the lens barrel 1 moves to the photographing state shown in FIG. 1 where it protrudes from the camera main body 100. At this time, the zoom lens is in the wide position.

When the lens barrel 1 moves from the retracted state to the photographing state, the rotating cam tube 70 rotates and moves the second unit support portion 80 to the photographic subject side in the optical axis direction.

Figure 4:
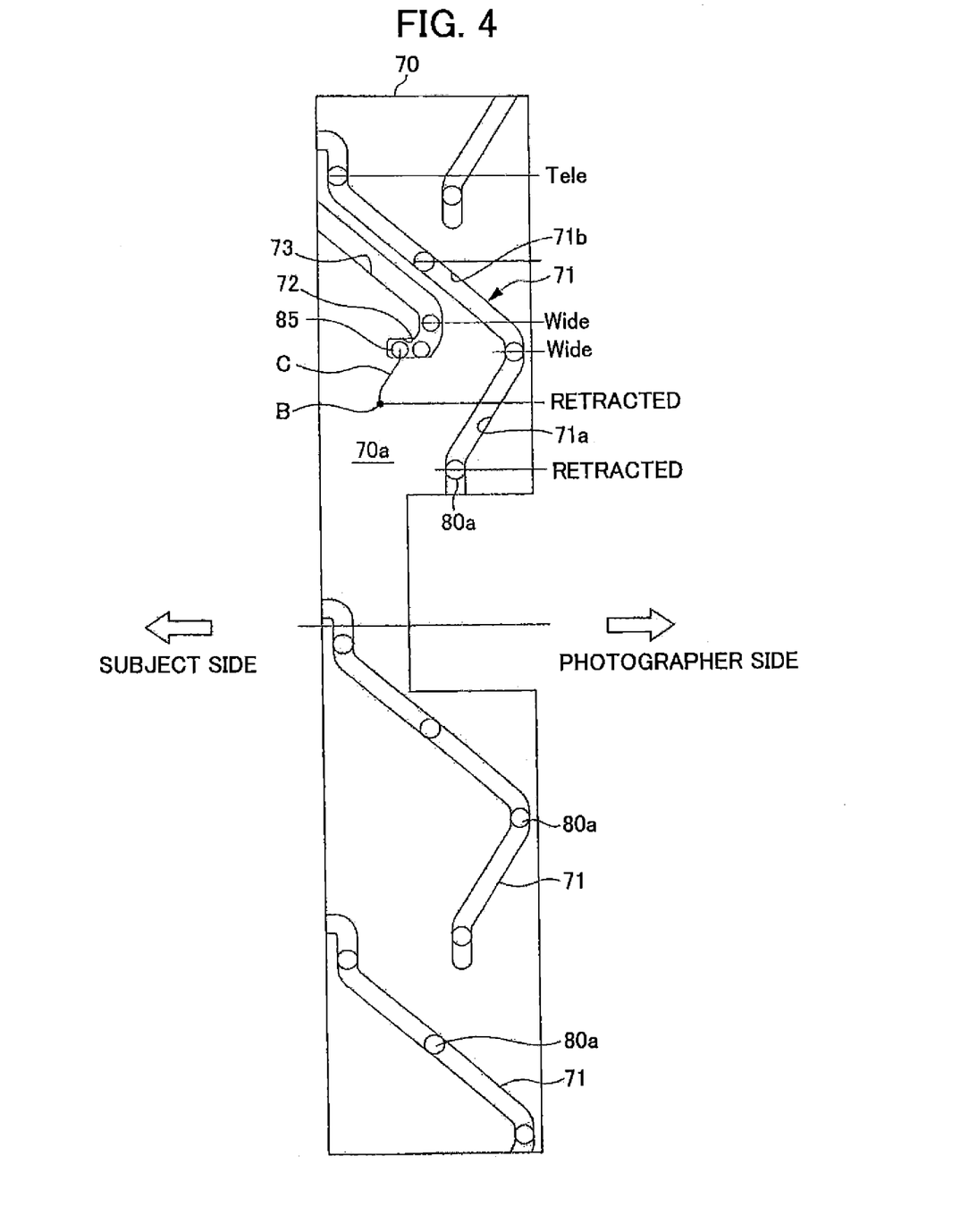
FIG. 4 is an expanded view showing the inner peripheral face of the rotating cam tube provided at the lens barrel shown in FIG. 1.

FIG. 4 is an expanded view showing the inner peripheral face of the rotating cam tube provided at the lens barrel shown in FIG. 1.

Cam grooves 71, into which the cam followers 80*a* provided at the second unit retaining portion are inserted, are formed at the rotating cam tube 70. Three of the cam grooves 71 are provided at approximately equal intervals about the central axis periphery of the rotating cam tube 70. Further, in FIG. 4, in order to show the state of movement of the cam follower 80*a*, a plurality of cam followers 80*a* are illustrated, but there is a single cam follower 80*a* inserted per one cam groove 71.

For the cam groove 71, the region 71*a* which drives the second unit support portion 80 when the lens barrel 1 moves from the retracted state to the photographing state, and the region 71*b* which drives the second unit support portion 80 in the optical axis direction when the zoom lens moves between the wide position and the tele position, have opposite slopes of the cam groove, and form an approximate V shape when in a planar view.

When the lens barrel 1 moves from the retracted state to the photographing state, the cam follower 80a moves inside the region 71a of the cam groove 71 according to the rotation of the rotating cam tube 70, and when the focal length of the zoom lens is changed in the photographing state, it moves inside the region 71b of the cam groove 71.

Here, when the lens barrel 1 is in the retracted state shown in FIG. 3 explained above (the second lens unit L2 is in the withdrawn state), the protuberance 85 provided at the second unit retaining frame 82 contacts the inner peripheral face 70a of the rotating cam tube 70. In the expanded view of the inner peripheral face of the rotating cam tube 70 shown in FIG. 4, the contact position of the protuberance 85 and the inner peripheral face 70a of the rotating cam tube 70 is explained assigning the reference numeral B.

When the rotating cam tube 70 rotates in the retracted state shown in FIG. 3, the second unit support portion 80 carries out translatory movement in the optical axis direction integrally with the second unit retaining frame 82.

Figure 5:
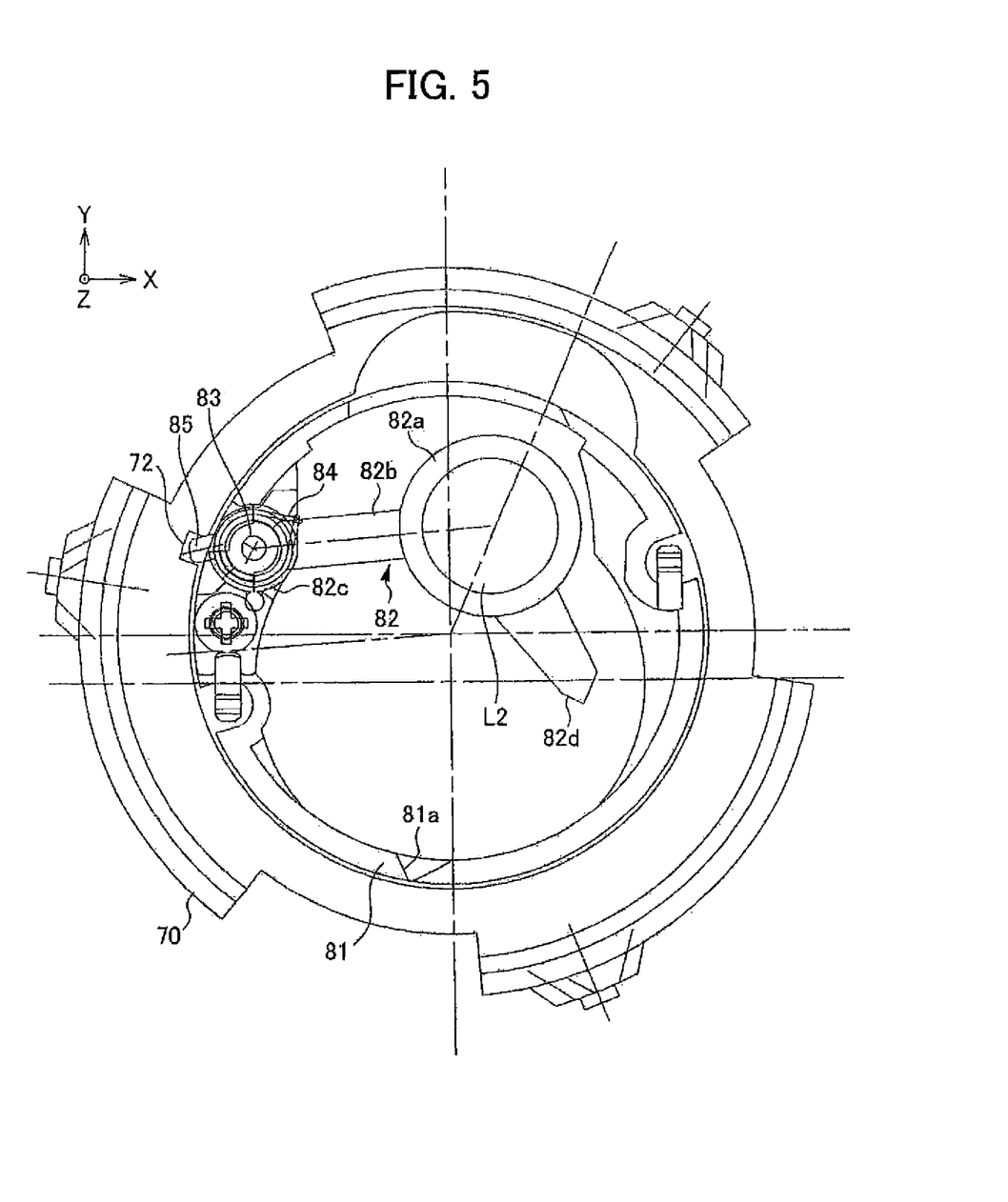
FIG. 5 is a plan view (during movement) seen from the optical axis direction of the rotating cam tube and the second unit support portion provided at the lens barrel shown in FIG. 1.

FIG. 5 is a plan view seen from the optical axis direction of the rotating cam tube and the second unit support portion provided at the lens barrel shown in FIG. 1, and shows a state disposed between the withdrawn position and the photographing position of the second lens unit L2.

As shown in FIG. 4, in addition to the cam groove 71 which drives the second unit support portion 80 in the optical axis direction, a driving groove 72 which drives the second unit retaining frame 82 between the withdrawn position and the photographing position is formed at the inner peripheral face of the rotating cam tube 70. The driving groove 72 is formed approximately parallel to the optical axis A. Further, in FIG. 4, in order to show the state of movement of the protuberance 85, a plurality of the protuberances 85 are illustrated, but there is a single protuberance 85 inserted per one driving groove 72.

The protuberance 85 formed at the second unit retaining frame 82 moves towards the photographer side of the optical axis direction while sliding at the inner peripheral face of the rotating cam tube 70, coupled to the movement of the second unit support portion 80 to the photographer side of the optical axis direction. Then, the protuberance 85 is biased in the direction of pressing of the inner peripheral face 70a of the rotating cam tube 70 by the torsion spring 84, and then, it is accommodated in the driving groove 72 according to the rotation of the rotating cam tube 70.

FIG. 5 shows the state where a portion of the protuberance 85 (about half) is inserted in the driving groove 72. Further, in FIG. 4, the locus of the movement of this protuberance 85 at this time is explained assigning the reference numeral C.

Figure 6:
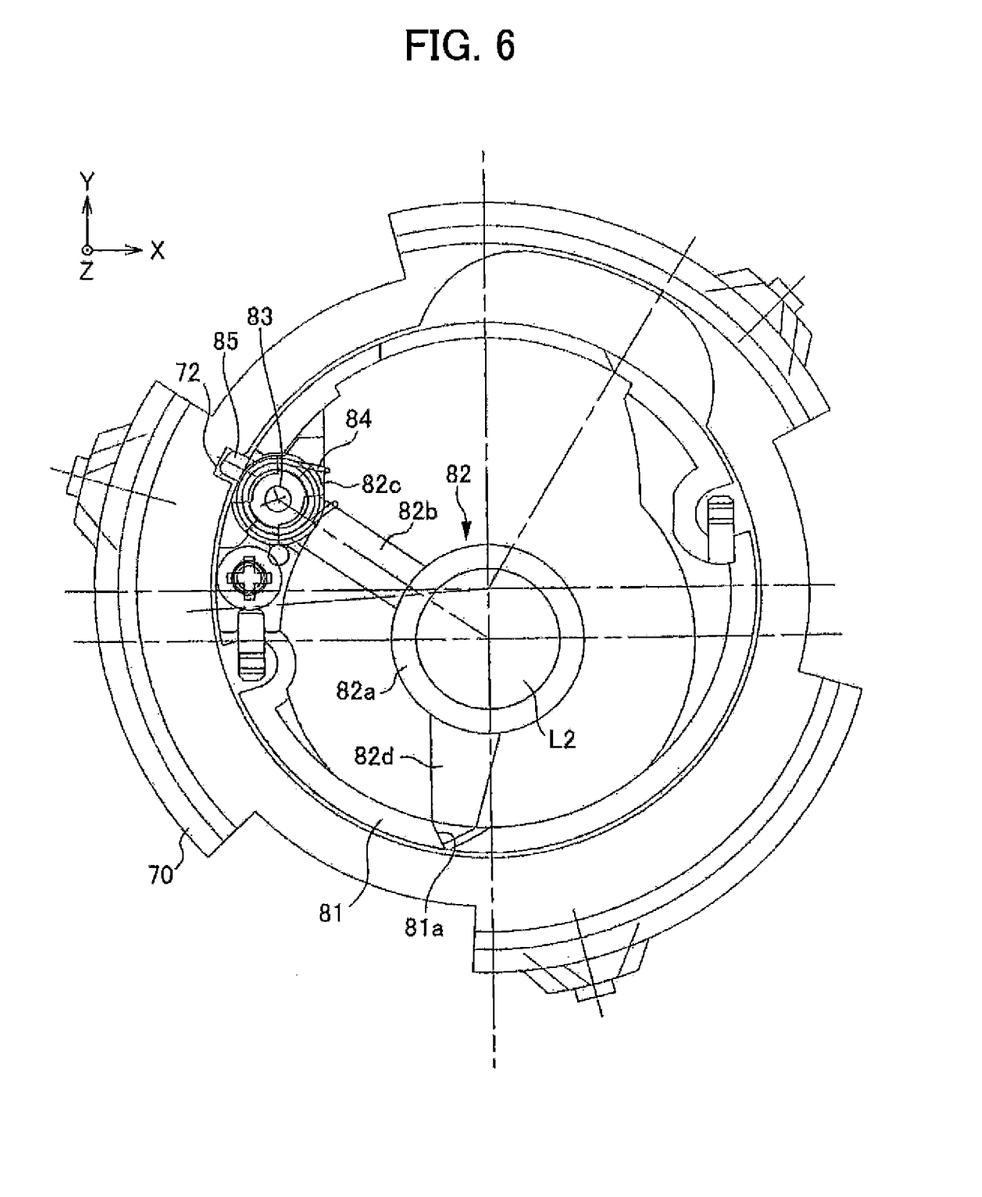
FIG. 6 is a plan view (photographing position) seen from the optical axis direction of the rotating cam tube and the second unit support portion provided at the lens barrel shown in FIG. 1.

FIG. 6 is a plan view seen from the optical axis direction of the rotating cam tube and the second unit support portion provided at the lens barrel shown in FIG. 1, and shows the lens barrel 1 in the state where the second lens unit L2 is disposed at the photographing position.

As shown in FIG. 6, when the protuberance 85 is inserted in the driving groove 72, the optical axis of the second lens unit L2 is at a photographic position substantially coinciding with the optical axes of the other lens units L1 and L3. In this photographing position, a position determining protuberance 82d formed projecting from the retaining portion 82a of the second unit retaining frame 82 is inserted in the position determining notch portion 81a formed at the inner peripheral face of the main body portion 81.

For the second unit support portion 80, the tip of the position determining protuberance 82d presses the inner side face of the position determining notch portion 81a by the biasing force of the torsion spring 84, and the second lens unit L2 is retained in the photographing position when the zoom lens moves between the wide position and the tele position.

When the second unit retaining frame 82 rotates about the rotating shaft 83, it moves from the withdrawn position to the photographing position, and is made to move from to the photographic subject side of the optical axis direction (the direction approaching the shutter unit 90) with respect to the main body portion 81.

FIG. 7 is a drawing showing the bearing structure of the second unit retaining frame provided at the lens barrel shown in FIG. 1.

In FIG. 7, (a) shows the second unit retaining frame 82 in a state where the second lens unit L2 is in the withdrawn position (refer to FIG. 2). Further, (c) shows the second unit retaining frame 82 in a state where the second lens unit L2 is in the photographing position (refer to FIG. 1). Further, (b) shows an intermediate state of the second unit retaining frame 82 moving from the state shown in (a) to the state shown in (c).

Figure 7A:
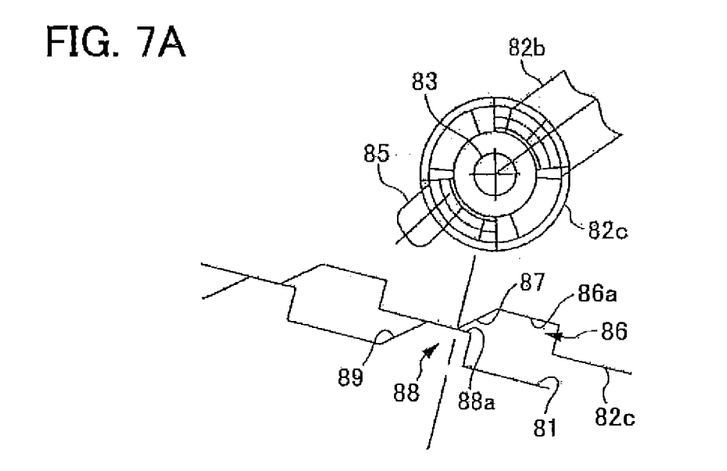
FIG. 7 is a view showing the bearing structure of the second unit retaining frame provided at the lens barrel shown in FIG. 1.
Figure 7B:
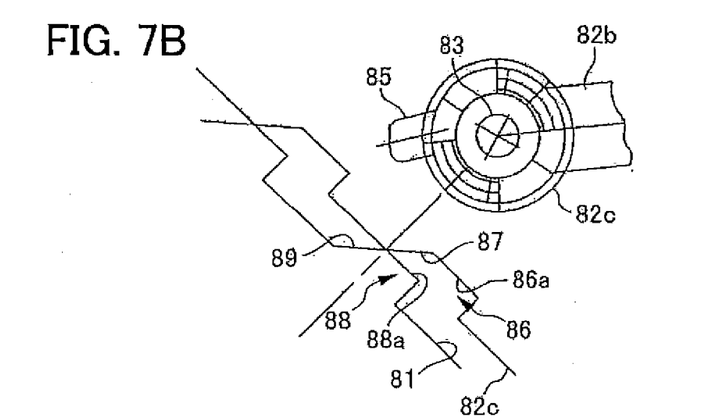
Figure 7C:
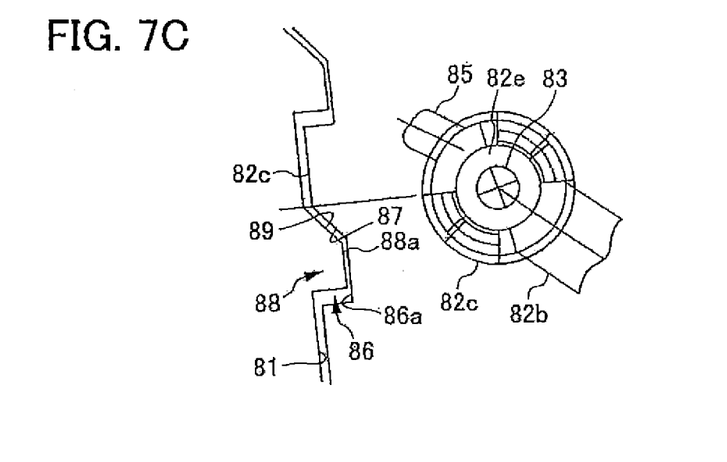
Figure 8:
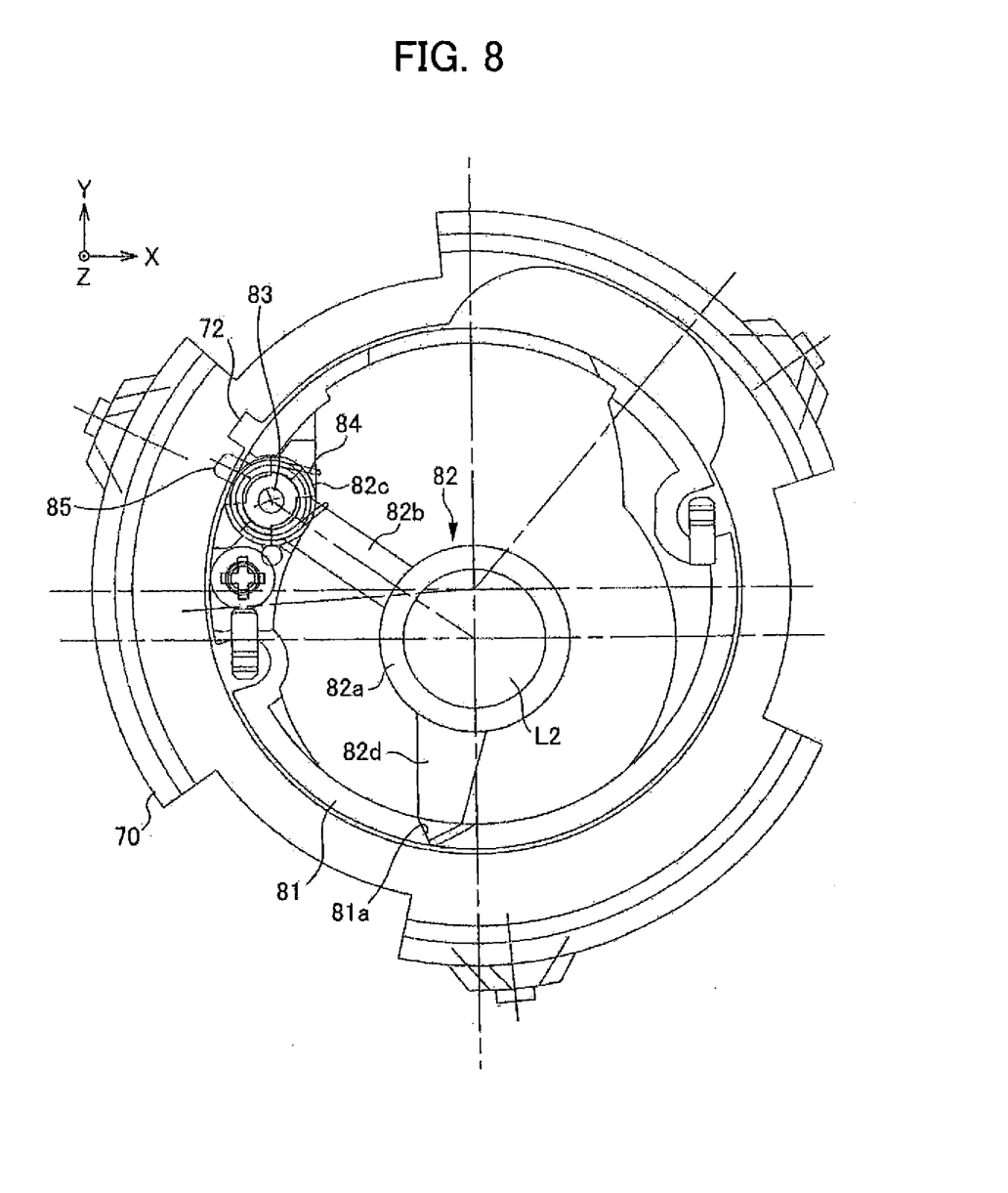
FIG. 8 is a plan view (wide position) seen from the optical axis direction of the rotating cam tube and the second unit support portion provided at the lens barrel shown in FIG. 1.

Further, each of the drawing of FIGS. 7(a) to (c) shows an expanded view of the bearing portion 82c and a plan view showing the appearance of the rotation of the second unit retaining frame 82.

The bearing portion 82c of the second unit retaining frame 82 is formed with a cylindrical shape. At the bearing portion 82c, recessed portions 86 are provided, formed such that the end face facing the main body portion 81 is recessed in the shaft line direction. The recessed portions 86 are formed at two locations flanking the rotating shaft 83. The end face facing the main body portion 81 of the rotating shaft 83, and the bottom face 86a of the recessed portion 86 form a continuous face via the cam face 87 provided inclined with respect to the plane perpendicular to the optical axis A.

On the other hand, a protruding portion 88 facing the recessed portion 86 provided at the bearing portion 82c is formed at the main body portion 81. The face portion facing the bearing portion 82c of the main body portion 81, and the tip face 88a of the protruding portion 88 form a continuous face via the cam face 89.

In the state where the second lens unit L2 is in a withdrawn position (refer to FIG. 2 and FIG. 3), as shown by FIG. 7(a), the end face 88a of the protrusion 88 abuts the end face facing the main body portion 81 at the bearing portion 82c, and these face portions regulate the position in the optical axis direction of the second lens unit L2.

Further, in order to move to the photographing position the second unit retaining frame 82 rotates about the rotating shaft 83, and at a position where the cam face 87 of the bearing portion 82c and the cam face 89 of the main body portion 81 overlap, such as shown in FIG. 7(b), the bearing portion 82c moves in a direction approaching the main body portion 81 by the biasing force towards the optical axis direction of the torsion spring 84. At this time, the cam face 87 and the cam face 89 slide.

In a state where the second lens unit L2 is disposed at the photographing position (refer to FIG. 1 and FIG. 6), the protruding portion 88 is accommodated in the recessed portion 86 as shown in FIG. 7(c), and compared to the state where the second lens unit L2 is in the withdrawn position shown in FIG. 7(a), the second unit retaining frame 82 and the main body portion 81 are close. The second lens unit L2, compared to the case of the withdrawn position, is close to the shutter unit 90 in the photographing position (refer to FIG. 1 and FIG. 2).

Further, in the state shown in FIG. 7(c), the cam face 87 and the cam face 89, and the bottom face 86a of the recessed portion 86 and the tip face portion 88a of the protruding portion 88 do not contact respectively, and the position in the optical axis direction of the second lens unit L2 is regulated by the abutting of the position determining face portion 83e provided at a region further towards the inner diameter side than the recessed portion 86 of the bearing portion 83c, with the main body portion 81 (refer to FIG. 1).

In this way, the second lens unit L2 carries out a movement operation (translatory motion) in the optical axis direction, along with a movement operation (rotational motion) from the withdrawn position to the photographing position. Then, the position in the optical axis direction of the lens vertex of the incident side of the second lens unit L2 (assigned the reference numeral D in FIG. 1) is made to overlap with the position in the optical axis direction of the shutter unit 90 (assigned the reference numeral E in FIG. 1), by the movement operation towards the optical axis direction of the second lens unit L2 in the lens barrel 1.

When the second unit retaining frame 82 moves from the photographing state shown in FIG. 1 to the retracted state shown in FIG. 2, the opposite movement of that shown in FIGS. 7(a) to (c) is carried out. When the second unit retaining frame 82 is rotated in a direction opposite to the case described above, the force in the rotation direction which the cam faces 87 and 89 exert on the second unit retaining frame 82 is converted to a force in the optical axis direction, and the second unit retaining frame 82 is moved in a direction away from the shutter unit 90 (the photographer side). The second unit retaining frame 82 carries out a rotating movement about the rotating shaft 83, but the cam faces 87 and 89 make the second unit retaining frame 82 move in a direction away from the shutter unit 90 immediately after the start of the rotating movement, and thus there is no interference between the second unit retaining frame 82 and the shutter unit 90.

Compared to a lens barrel (omitted from the figures) which does not move in the optical axis direction coupled with the rotating motion of the second unit retaining frame 82, in the lens barrel 1 of the present embodiment the second lens unit L2 can be made to come nearer to the shutter unit 90, thus the dimension in the optical axis direction of the lens barrel 1 can be shortened for the amount of movement in the optical axis direction.

As explained above, the second unit retaining frame 82 moves in the optical axis direction along with the rotation action, and the protuberance 85 also moves in the optical axis direction in combination with this.

Concerning this, the above mentioned driving groove 72 is formed parallel to the optical axis A, thus when the second unit retaining frame 82 moves in the optical axis direction along with the rotation action, the protuberance 85 moves in the driving groove 72.

In the lens barrel 1, in the state shown in FIG. 6, the second lens unit L2 is disposed at the photographing position, but the photographic optical system overall is not fully in the wide position, and the rotating cam barrel 70 further rotates from the state shown in FIG. 6.

When the rotating cam barrel 70 rotates, the cam follower 80a is guided by the cam groove 71, and the second unit support portion 80 moves to the photographic subject side in the optical axis direction, and the zoom lens is set to the wide position.

On the other hand, if the second lens unit L2 is already in the photographing position, the position determining protuberance 82d is in contact with the position determining notch portion 81a, thus if the second unit retaining frame 82 were rotated beyond the state shown in FIG. 6, there is the possibility of applying a load to the arm portion 82b or the like.

Concerning this, in the rotating cam barrel 70 of the present embodiment, an escape groove 73 is provided, formed continuously with the driving groove 72. The escape groove 73 is formed parallel to the cam groove 71.

The second unit retaining frame 82 at the photographing position moves in the optical axis direction integrally with the main body portion 81, thus the protuberance 85 moves in the same locus as the cam follower 80a. The escape groove 73 is formed to be parallel to the cam groove 71 and therefore in the state where the second lens unit L2 is disposed in the photographing position, even if the second unit support portion 80 moves in the optical axis direction, the protuberance 85 moves within the escape groove 73 and thus, the second unit retaining frame 82 does not rotate about the rotating shaft 83.

Also, when the zoom lens moves between the wide position and the tele position, the protuberance 85 moves inside the escape groove 73, and the second lens unit L2 is maintained at the photographing position.

According to the lens barrel 1 of the embodiment explained above, it is possible to obtain the following effects.

(1) As a mechanism for driving the second lens unit L2, which is a withdrawing optical system, between the withdrawn position and the photographing position, it can be considered to use a mechanism for driving the second unit retaining frame 82 which retains the second lens unit L2, with an electric motor or the like, but in this case, there is the possibility that the lens barrel 1 will be enlarged.

Further, it can be considered use a mechanism where a protuberance having a cam face formed at its tip portion is provided at the CCD support 11, and when the second unit support portion 80 approaches the CCD support 11 during the retracting movement, the second unit retaining frame 82 is driven to a withdrawn position by the protuberance. However, in this case, the return force from the second unit retaining frame 82 acts on the CCD support 11 in the optical axis direction, and thus it would be necessary to reinforce the CCD support 11 or the like.

In contrast, in the lens barrel 1 of the present embodiment, the second unit retaining frame 82 is driven by the driving groove 72 formed at the inner peripheral face of the rotating cam barrel 70 and the protuberance 85 formed at the second unit retaining frame 82, and thus the lens barrel 1 can be miniaturized. Further, it is not necessary to reinforce the CCD support 11.

(2) A torsion spring 84 which biases the second lens unit L2 to the photographing position is provided, and thus the position of the second lens unit L2 when photographing is stable. Further, this torsion spring 84 also has the function of an biasing spring which biases the second unit retaining frame 82 to the main body portion 81 of the second unit support portion 80 in the photographing position, thus space is used efficiently.

(3) In the photographing state shown in FIG. 1, the position of the second lens unit is regulated by the abutting of the position determining face portion 83e to the main body portion 81, and this prevents applying a burden to the protruding portion 88.

(4) The protuberance 85 is provided at the bearing portion 82c, thus it is possible to make the second lens unit L2 make a large movement with a small rotation of the bearing portion 82c.

(5) In the photographing state, compared to a lens barrel where the positions in the optical axis direction of the second lens unit L2 and the shutter unit 90 do not overlap, in the lens barrel 1 of the present embodiment the second lens unit L2 and the shutter unit 90 can be close together, thus the dimension in the optical axis direction can be shorter. Further, the first lens unit L1 and the second lens unit L2 are close, thus there is an advantage in ensuring the optical performance of the optical system overall.

(6) The driving groove 72 is provided parallel to the optical axis, thus even if the second unit retaining frame 82 is moved in the optical axis direction coupled with the rotating movement, the protuberance 85 does not override to the inner peripheral face 70a of the rotating cam tube 70.

(7) The escape groove 73 is provided parallel to the cam groove 71, thus when driving the second unit support portion 80 in the optical axis direction, the second lens unit L2 is retained in the photographing position without rotating the second unit retaining frame 82.

(8) The cam faces 87 and 89 for driving the second unit retaining frame 82 are provided at two locations about the rotating shaft 83, and thus the second unit retaining frame 82 can be stabilized and driven in the optical axis direction.

(9) The cam faces 87 and 89 are provided at two locations about the rotating shaft 83, and thus the second unit retaining frame 82 can be stabilized and driven in the optical axis direction.

(10) A torsion spring 84 which biases the second unit retaining frame 82 in a direction to approach the main body portion 81 of the second unit support portion 80 is provided, and thus the position of the second lens unit L2 when photographing is stabilized. Further, this torsion spring 84 also has the function of a torsion spring which biases the second unit retaining frame 82 from the withdrawn position to the photographing position and thus, space is used efficiently.

(11) A protuberance 85 for rotationally driving the second unit retaining frame 82 is provided at the bearing portion 82c, and thus it is possible to make the second lens unit L2 make a large movement with a small rotation of the bearing portion 82c.

(12) The driving groove 72 for rotationally driving the second unit retaining frame 82 is provided parallel to the optical axis, and thus even if the second unit retaining frame 82 moves in the optical axis direction coupled with the rotational movement, the protuberance 85 does not override to the inner peripheral face 70a of the rotating cam tube 70.

Modifications and Variations

The present invention is not limited to the above embodiment, and is subject to various modifications and variations such as those shown below, and these are all included within the technical scope of the present invention.

(1) In the lens barrel of the embodiment, a driving groove (recessed portion) which drives the second lens unit which is a withdrawing optical system, between the withdrawn position and the photographing position is formed at the rotating cam tube which drives the second lens unit in the optical axis direction, but the driving groove is not limited to this, and may be formed at another member (for example, a specialized moving member).

(2) In the embodiment, an escape groove is provided parallel to the cam groove, but is not limited to this provided that the protuberance cannot override to the inner peripheral portion of the rotating cam tube, for example, it is possible to indent the inner peripheral face of the rotating cam tube in a larger area than in the embodiment.

(3) The protuberance of the embodiment is provided at the shaft bearing, sandwiching the rotating shaft at the opposite side of the arm portion, but is not limited to this, and may be provided at a part other than the shaft bearing.

(4) The lens barrel of the embodiment is provided in a camera, but is not limited to this, and for example, may be provided in another optical apparatus such as a telescope or binoculars.

(5) In the lens barrel of the embodiment, the retaining frame is driven in the optical axis direction by a cam mechanism, but so long as it is capable of driving the retaining frame in the optical axis direction in accordance with a rotating movement, it is not limited to this, and for example, the retaining frame may be guided in the optical axis direction by a screw mechanism, a helicoid mechanism and the like.

(6) In the present embodiment, the cam face which drives the second unit retaining frame in the optical axis direction is formed at the bearing portion, but it is not limited to this, and for example, it may be formed on another portion of the second unit retaining frame such as the arm portion or the like.

(7) The cam face is formed at two locations about the rotating shaft, but it is not limited to this, and may be formed at one location, or three locations or more.

The invention claimed is:

1. A lens barrel comprising:
   a lens which is retained by a retaining frame pivotally supported by a shaft portion parallel to an optical axis, and is configured to move between a non-photographing position and a photographing position in a plane perpendicular to the optical axis by rotation of the retaining frame about the shaft portion,
   a protuberance provided at the retaining frame and formed so as to protrude in a direction perpendicular to the optical axis,
   a moving member configured to move with respect to the retaining frame, and which includes a retaining face portion which, in a state where the retaining face portion abuts the protuberance, retains the lens in the non-photographing position, and a recessed portion formed at one portion of the retaining face portion, and
   a main body portion at which the shaft portion is retained and moveable relative to the moving member, wherein:
   the protuberance moves between a state where the protuberance abuts the retaining face portion, and a state where the protuberance is accommodated in the first recessed portion, in accordance with a movement of the moving member,
   the lens is maintained in the photographing position in the state where the protuberance is accommodated in the first recessed portion,
   a second recessed portion is provided in the retaining frame,
   a protruding portion corresponding to the second recessed portion is provided in the main body portion, and
   the retaining frame moves in the optical axis direction with respect to the main body portion, coupled with a rotating movement about the shaft portion, due to the change in the state of the engagement between the second recessed portion and the protruding portion.

2. The lens barrel according to claim 1, further comprising:
   an biasing portion configured to bias the retaining frame in a direction such that the protuberance presses the retaining face portion of the moving member.

3. The lens barrel according to claim 1, wherein:
   the protuberance is accommodated in the recessed portion after sliding to the retaining face portion, by the movement in a first direction of the moving member, and
   the recessed portion includes an accommodating retaining region which retains the protuberance in an accommodated state even if the moving member moves further in the first direction when the protuberance is in the accommodated state.

4. The lens barrel according to claim 3, wherein:
the moving member includes a cam groove which makes the retaining frame move in the optical axis direction by the movement in the first direction in a state where the protuberance is accommodated in the recessed portion,
the accommodating retaining region is a parallel groove portion formed parallel to the cam groove, and
if the retaining frame moves in the optical axis direction, the protuberance moves into the parallel groove portion.

5. The lens barrel according to claim 1, wherein:
the retaining frame is configured to move in the optical axis direction with respect to the moving member, coupled with a rotating movement about the shaft portion,
the recessed portion provided on the moving member includes a linear groove portion provided parallel to the optical axis, and
the protuberance is configured to move in the linear groove portion when the retaining frame moves in the optical axis direction.

6. The lens barrel according to claim 1, wherein
the retaining frame includes a bearing portion which is pivotally supported by the shaft portion, a retaining portion which retains the lens, and a connecting portion which connects the bearing portion and the retaining portion, and
the protuberance is formed at the bearing portion.

7. The lens barrel according to claim 1, wherein:
the moving member is a tube accommodating the retaining frame at an inner diameter side,
the retaining face portion and the recessed portion are respectively formed at an inner peripheral face of the moving member,
the protuberance transfers between a state abutting the retaining face portion, and a state accommodated in the recessed portion, by rotation of the moving member about the moving member's center.

8. A lens barrel comprising:
a lens which is retained at a retaining frame pivotally supported by a shaft portion parallel to an optical axis, and which moves between a non-photographing position and a photographing position in a plane perpendicular to the optical axis by rotation of the retaining frame about the shaft portion,
a moving member configured to move relative to the retaining frame and provided with a first recessed portion rotationally driving around the shaft portion of the retaining frame,
a main body portion to which the shaft portion is retained and is configured to move relative to moving member,
a support portion configured to pivotally support the retaining frame, and
a driving mechanism configured to drive the retaining frame in an optical axis direction with respect to the support portion according to a rotating movement about the shaft portion of the retaining frame.

9. The lens barrel according to claim 8, wherein:
the retaining frame includes a bearing portion which is pivotally supported by the shaft portion, and
the driving mechanism drives the bearing portion in the optical axis direction.

10. The lens barrel according to claim 8, wherein:
the driving mechanism is formed at two locations sandwiching the shaft portion.

11. The lens barrel according to claim 8, wherein:
the driving mechanism is a cam mechanism configured to convert power in a rotational direction acting on the retaining frame into power in the optical axis direction.

12. The lens barrel according to claim 11, wherein:
the cam mechanism includes an inclined face portion formed inclined with respect to a face perpendicular to the optical axis, and a sliding portion provided at the inclined face portion configured to slide in response to a rotating movement of the retaining frame, and
the retaining frame moves in the optical axis direction by the sliding portion being guided by the inclined face portion during the rotating movement.

13. The lens barrel according to claim 12, wherein:
the inclined face portion is provided at both the retaining frame and the support portion, and the retaining frame is driven in the optical axis direction by sliding of the inclined face portions with respect to each other.

14. The lens barrel according to claim 8, wherein:
the retaining frame is provided with a planar portion perpendicular to the optical axis, and in the state where the retaining frame has drawn close to the support portion, the position in the optical axis direction with respect to the support portion is regulated by the abutting of the planar portion and the support portion.

15. The lens barrel according to claim 8, further comprising:
an biasing portion configured to bias the retaining frame towards the support portion.

16. An optical instrument comprising the lens barrel according to claim 1.

* * * * *